United States Patent
Kanuri et al.

(10) Patent No.: US 12,424,694 B2
(45) Date of Patent: Sep. 23, 2025

(54) ELECTRIC VEHICLE BATTERY RETENTION AND EJECTION SYSTEM

(71) Applicants: Adhista Kanuri, South Glastonbury, CT (US); Ishetha Kanuri, South Glastonbury, CT (US); Isaac Tarutin, Glastonbury, CT (US); Theodore Tarutin, Glastonbury, CT (US); Annika Tarutin, Glastonbury, CT (US); Abhirami Vedula, South Glastonbury, CT (US); Eva Tartamella, South Glastonbury, CT (US); Vrishank Pittala, Glastonbury, CT (US); Andrew Mathew, Glastonbury, CT (US)

(72) Inventors: Adhista Kanuri, South Glastonbury, CT (US); Ishetha Kanuri, South Glastonbury, CT (US); Isaac Tarutin, Glastonbury, CT (US); Theodore Tarutin, Glastonbury, CT (US); Annika Tarutin, Glastonbury, CT (US); Abhirami Vedula, South Glastonbury, CT (US); Eva Tartamella, South Glastonbury, CT (US); Vrishank Pittala, Glastonbury, CT (US); Andrew Mathew, Glastonbury, CT (US)

( * ) Notice: Subject to any disclaimer, the term of this patent is extended or adjusted under 35 U.S.C. 154(b) by 307 days.

(21) Appl. No.: 18/213,000

(22) Filed: Jun. 22, 2023

(65) Prior Publication Data

US 2024/0429526 A1   Dec. 26, 2024

(51) Int. Cl.
*B60K 1/04* (2019.01)
*H01M 50/244* (2021.01)
(Continued)

(52) U.S. Cl.
CPC ....... *H01M 50/249* (2021.01); *H01M 50/244* (2021.01); *H01M 50/264* (2021.01);
(Continued)

(58) Field of Classification Search
CPC .... B60K 1/04; H01M 50/249; H01M 50/244; H01M 50/264; Y02E 60/10
See application file for complete search history.

(56) References Cited

U.S. PATENT DOCUMENTS 4,317,497 A * 3/1982 Alt ...................... H01M 50/209
                                                    180/68.5
5,549,443 A * 8/1996 Hammerslag ............ B60K 1/04
                                                    180/68.5
(Continued)

FOREIGN PATENT DOCUMENTS

CN      111660838 A      9/2020
CN      112208332 A      1/2021
(Continued)

*Primary Examiner* — Jason D Shanske
*Assistant Examiner* — James J Triggs
(74) *Attorney, Agent, or Firm* — Carlson, Gaskey & Olds, P.C.

(57) ABSTRACT

A vehicle battery retention and ejection system includes a housing having a portion that closes an opening of the housing. A latch secures the portion of the housing in a closed position when the latch is in a first condition and allows the portion of the housing to open when the latch is in a second, different condition. A biasing member, such as a spring, applies a force onto a battery in the housing to urge the battery out of the housing. The latch, the biasing member, or both comprises a shape memory material. The shape memory material transitions to a different state when the temperature of the battery exceeds a threshold temperature. As a result, the latch transitions from the first condition to the second condition so the portion of the housing moves (Continued)

into the open position and the biasing member forces the battery out of the housing.

10 Claims, 5 Drawing Sheets

(51) Int. Cl.
    *H01M 50/249*    (2021.01)
    *H01M 50/264*    (2021.01)
    *B60S 5/06*    (2019.01)

(52) U.S. Cl.
    CPC ............ *B60S 5/06* (2013.01); *H01M 2200/10* (2013.01); *H01M 2220/20* (2013.01)

(56) References Cited

U.S. PATENT DOCUMENTS

| | | | | |
|---|---|---|---|---|
| 5,711,648 A | * | 1/1998 | Hammerslag | ........... B60L 50/66 |
| | | | | 180/68.5 |
| 6,474,429 B1 | * | 11/2002 | Nishio | ..................... B60K 1/04 |
| | | | | 280/783 |
| 6,662,891 B2 | * | 12/2003 | Misu | ..................... B60W 10/30 |
| | | | | 903/952 |
| 7,374,004 B2 | * | 5/2008 | Kraimer | ................... B60K 1/04 |
| | | | | 180/68.5 |
| 8,256,553 B2 | * | 9/2012 | De Paschoal | ........... B60L 53/80 |
| | | | | 180/68.5 |
| 10,870,365 B2 | * | 12/2020 | Ahrens | ................... B60L 53/80 |
| 11,165,116 B2 | * | 11/2021 | Ribbentrop | ............. B60L 50/64 |
| 12,077,213 B2 | * | 9/2024 | Hammond, Jr. | ....... B62D 21/02 |
| 2018/0159110 A1 | * | 6/2018 | Tuomola | ................. B60L 53/80 |
| 2021/0284005 A1 | * | 9/2021 | Yun | ........................ G08B 17/00 |

FOREIGN PATENT DOCUMENTS

| | | |
|---|---|---|
| CN | 213861881 U | 8/2021 |
| DE | 102011080053 A1 | 1/2013 |
| EP | 2497691 A1 | 9/2012 |

* cited by examiner

ELECTRIC VEHICLE BATTERY RETENTION AND EJECTION SYSTEM

BACKGROUND

Electrified vehicles are considered desirable compared to vehicles that depend on an internal combustion engine because they do not introduce exhaust emissions into the atmosphere, they are quieter, and they typically provide a smoother ride experience. Electric motors on such vehicles require a portable source of electrical power and lithium ion batteries typically provide that power.

There are several challenges presented by lithium ion batteries used for powering vehicles. In some circumstances, thermal runaway of a battery may occur in which the temperature of the battery rises to an undesirably high level. Thermal runaway may occur because of cell shorting, abnormal charging, or high ambient temperatures. Thermal runaway of one battery of a battery pack may spread to other cells, resulting in damage to the battery pack and potential damage to the vehicle.

SUMMARY

An example vehicle battery retention and ejection system includes a housing having at least one portion that selectively closes an opening of the housing. A latch secures the portion of the housing in a closed position when the latch is in a first condition. The latch allows the portion of the housing to move into an open position when the latch is in a second, different condition. A biasing member is configured to apply a force onto a battery in the housing to urge the battery out of the housing. At least one of the latch and the biasing member comprises a shape memory material that is in a first state when a temperature of the battery is below a threshold temperature. The shape memory material transitions to a second state when the temperature of the battery exceeds the threshold temperature. The second state of the shape memory material causes the latch to transition from the first condition to the second condition so the portion of the housing moves into the open position and the biasing member forces the battery out of the housing through the opening.

The various features and advantages of at least one disclosed example embodiment will become apparent to those skilled in the art from the following detailed description. The drawings that accompany the detailed description can be briefly described as follows.

DETAILED DESCRIPTION

Figure 1A:
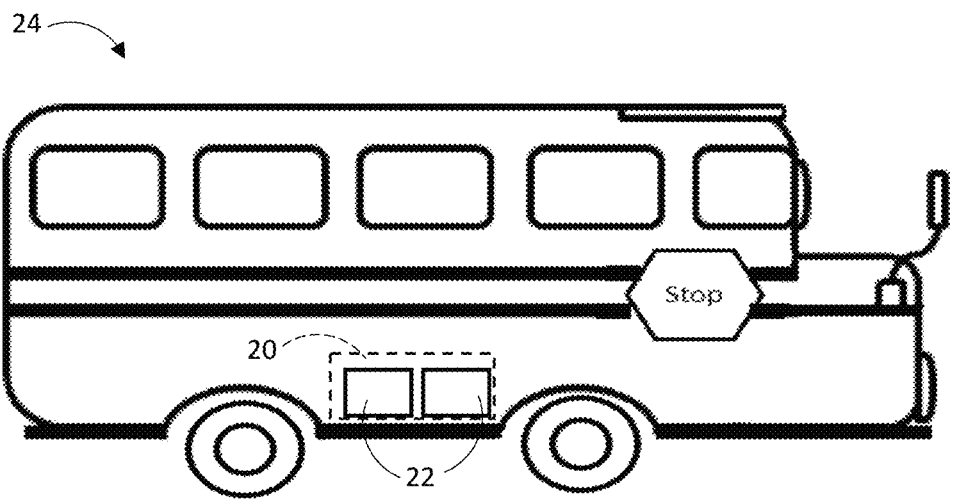
FIG. 1A schematically illustrates an example vehicle that includes at least one battery that provides energy for moving the vehicle.
Figure 1B:
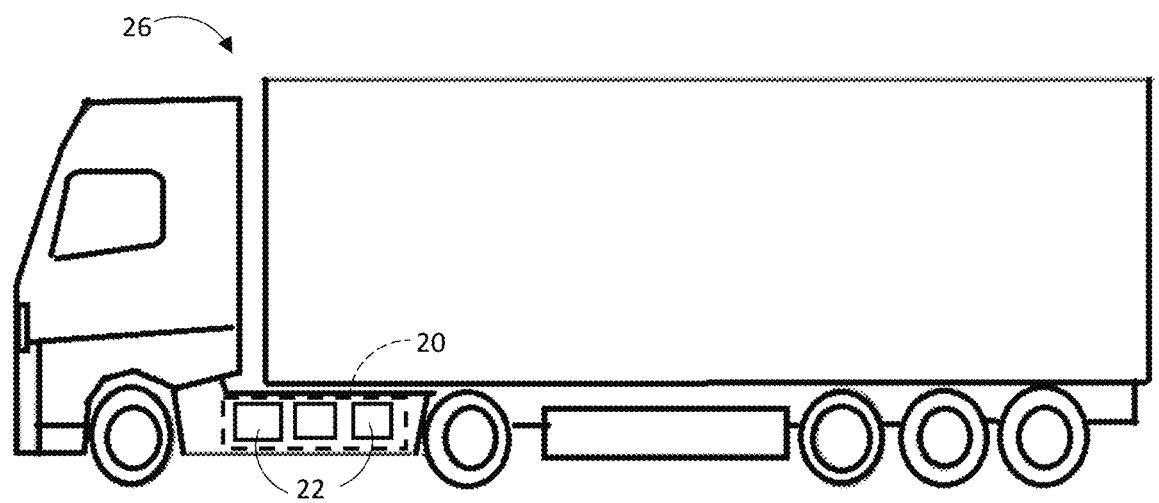
FIG. 1B schematically illustrates another example vehicle that includes at least one battery that provides energy for moving the vehicle.

FIG. 1A schematically illustrates a battery retention and ejection system 20 that is configured to support a selected number of batteries 22 on a vehicle 24, which is a passenger bus in this example. FIG. 1B shows a battery retention and ejection system 20 another another type of vehicle, which is a truck. The type of vehicle 24 or 26 may vary from those that are shown for discussion purposes.

Figure 2:
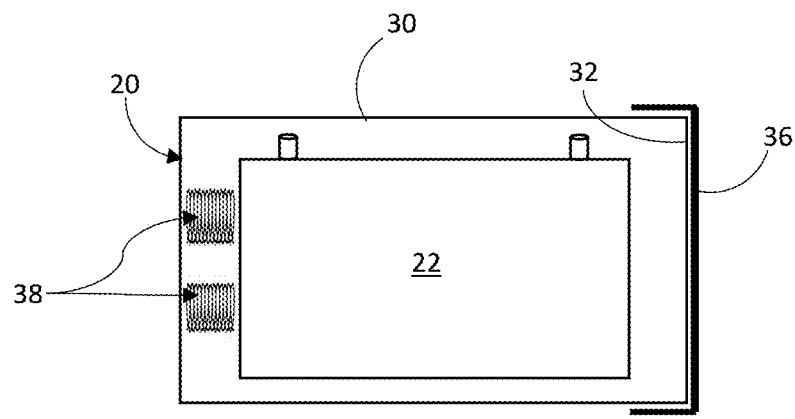
FIG. 2 schematically illustrates a battery situated in a housing that includes a retention and ejection system designed according to an embodiment of this invention.
Figure 3:
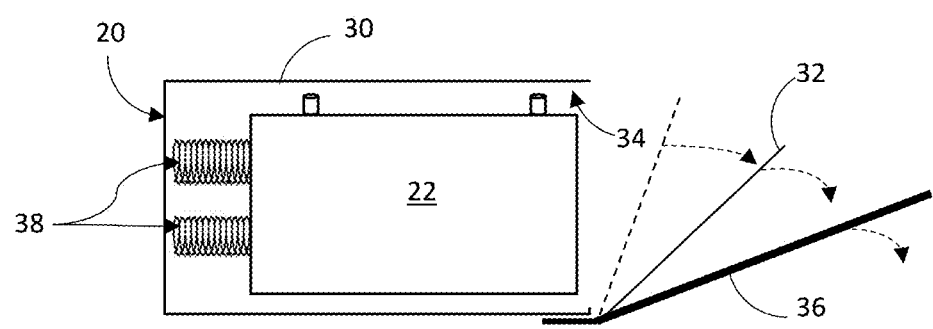
FIG. 3 schematically illustrates a condition of the embodiment of FIG. 2 during a beginning of a battery ejection operation.
Figure 4:
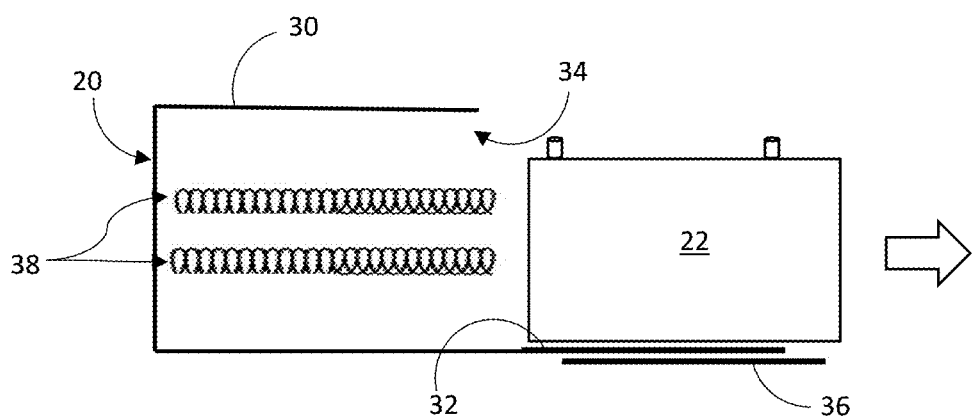
FIG. 4 schematically illustrates a condition subsequent to the condition shown in FIG. 3.

FIGS. 2-4 schematically show one example configuration of a battery retention and ejection system 20. A housing 30 is configured to contain and support a selected number of batteries 22. The housing 30 includes a portion 32, such as a panel or door, that selectively closes an opening 34 of the housing 30. In this example, the portion 32 is referred to as a door. A latch 36 secures the door 32 in a closed position for maintaining the battery 22 inside the housing 30. At least one biasing member 38, such as a spring, applies a biasing force that urges the battery 22 out of the housing 30. The force of the biasing member 38 is sufficient to propel the battery 22 through the opening 34 when the door 32 is in an open position.

Under most operating conditions, the latch 36 keeps the door 32 closed so the battery remains inside the housing 30. The system 20 automatically releases the latch 36 so the door 32 opens and the battery 22 is ejected from the housing 30 and away from the associated vehicle if the temperature of the battery 22 becomes undesirably high.

In the example configuration shown in FIGS. 2-4, the latch 36 is made of a shape memory material, such as Nitinol, that is in a first state when a temperature of the material is below a threshold temperature. The shape memory material transitions to a second state when the temperature of the material exceeds the threshold temperature.

When a shape memory alloy, such as Nitinol, is in its martensitic form, it is easily deformed to a new shape that it holds absent an increase in temperature above a transformation threshold temperature. However, when the alloy is heated beyond its transformation temperatures, it reverts to austenite and recovers its previous shape with great force. This process is known as shape memory.

For example, at temperatures below the threshold temperature, the shape memory material retains a shape that maintains the latch 36 in the first condition that keeps the door 32 from opening while the shape memory material is in the first state. The shape memory material transitions from the first state to the second state as a result of the temperature of the battery 22 heating the shape memory material above the threshold temperature. In this example, the second state of the shape memory material causes the latch 36 to transition from the first condition to the second condition so the door 32 moves into the open position as schematically shown in FIG. 3.

The second condition of the latch 36 includes at least a portion of the latch 36 moving into a different position or orientation relative to another portion of the latch 36, which releases or unlocks the latch 36. For example, a clasping portion of the latch 36 may move from a bent orientation as shown at the top of FIG. 2 into a straightened orientation as shown in FIGS. 3 and 4. The shape memory material changes into the straightened orientation of the second condition of the latch 36 because that orientation is the memorized configuration. The configuration of the latch 36 in the first condition, which is associated with the first state of the shape memory material, keeps the door 32 closed as long as the temperature of the shape memory material remains low enough for the latch 32 to remain in the shape or orientation needed to prevent the door 32 from opening. Once the temperature of the shape memory material reaches the threshold, the material properties cause the latch 36 to transition into the second condition.

FIG. 4 shows the battery 22 being ejected from the housing 30 and pushed away from the vehicle. That way any extreme temperature of the battery 22 will not cause damage to the vehicle. Additionally, removing the battery 22 from the vehicle makes it easier for professionals, such as fire fighters, to take steps to contain the battery 22 in a manner that reduces any risk of damage to property near the vehicle.

The springs of the biasing member 38 in the example shown in FIGS. 2-4 may be standard springs made of a material, such as metal, that will not melt before the latch 36 transitions from the first condition to the second condition.

Figure 5:
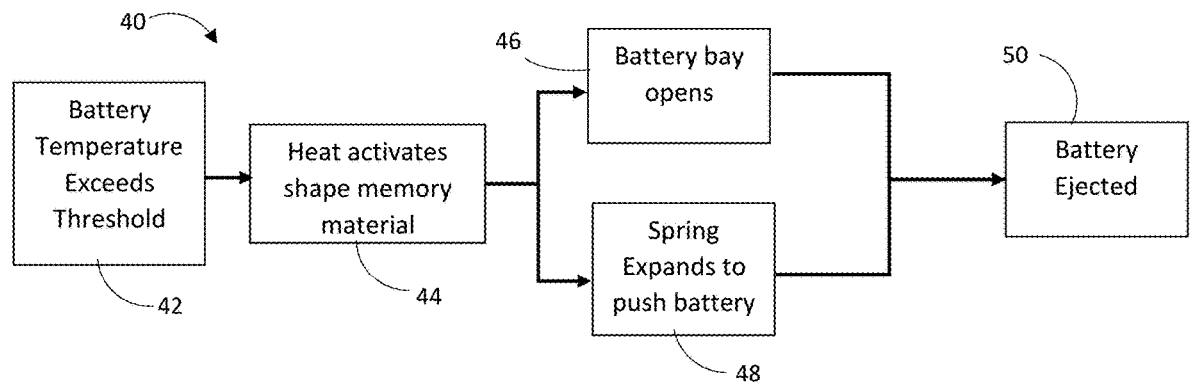
FIG. 5 is a flowchart diagram summarizing a battery ejection operation.

FIG. 5 is a flowchart diagram 40 summarizing operation of the system 20. At 42, the battery temperature exceeds a predetermined threshold temperature. The heat from the battery 22 activates the shape memory material at 44. At 46, the door 32 of the housing 30 opens because the activated shape memory material unlocks the latch 36. At 48, the biasing member 38 expands and pushes the battery 22 out of the battery bay of the housing 30. At 50, the battery is fully ejected from the housing 30 and moved away from the vehicle.

Figure 6:
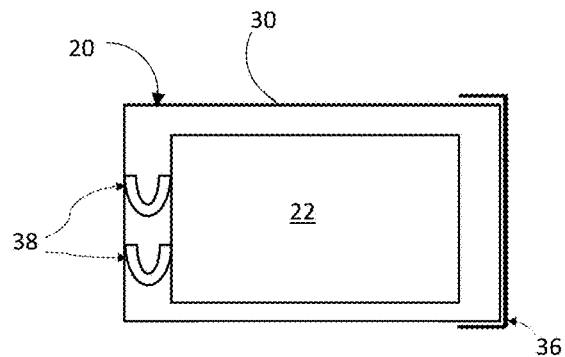
FIG. 6 schematically illustrates another example embodiment of a battery retention and ejection system while the battery is held in the housing.
Figure 7:
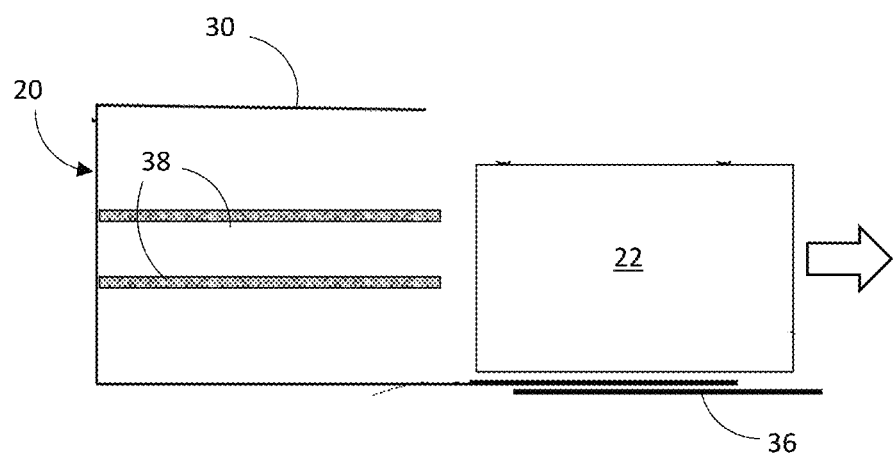
FIG. 7 schematically illustrates a condition of the embodiment of FIG. 6 during a battery ejection operation.

In some example configurations, the biasing member 38 is made of a shape memory material. FIGS. 6 and 7 schematically show one such example system 20. The biasing member 38 in this example includes multiple shape memory pieces, such as rods, that are in a compressed or bent shape when the latch 36 is in the first condition holding the door 32 closed. If a sufficiently high battery temperature activates the shape memory material of the biasing member 38, the pieces extend or straighten and, as a result, force the battery 22 out of the housing through the opening 34 as shown in FIG. 7.

The biasing member 38, which may be made of Nitinol, reacts to an increase in temperature caused by a rising battery temperature within the housing 30 and expands to more than twice the length of the bent or compressed shape shown in FIG. 6. This expansion in length will force the battery 22 out of the battery bay of the housing 30 as the temperature goes above a threshold, such as 60° C. The threshold temperature can be tuned to lower or higher temperatures by selecting the shape memory material alloy composition, which in some embodiments would include changing the ratio of Nickel and Titanium in Nitinol.

The latch 36 in the example of FIGS. 6 and 7 may be made of shape memory material as described above. In some embodiments, the latch 36 is not made of shape memory material but is configured to hold the door 32 closed until the force associated with the straightening of the pieces of the biasing member 38 forces the battery 22 against the door 32 and overcomes the closing force of the latch 36.

Figure 8:
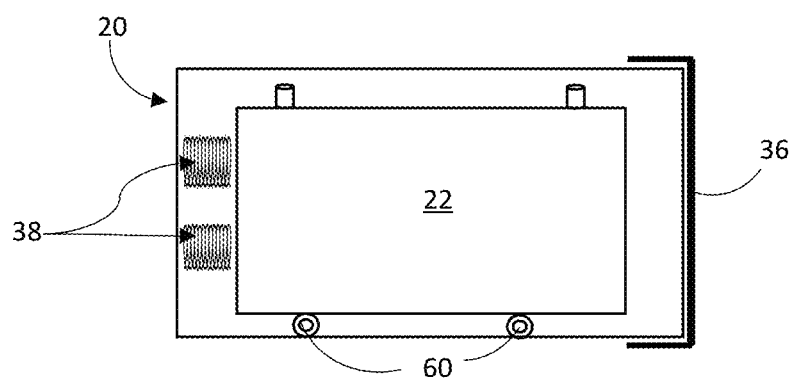
FIG. 8 schematically illustrates another example embodiment of a battery retention and ejection system while the battery is held in the housing.

FIG. 8 shows an example configuration that includes rollers 60 that rotate to facilitate movement of the battery 22 out of the housing under high battery temperatures conditions. The rollers 60 assist in moving the battery 22 further from the vehicle because the battery 22 may move at a higher speed and with greater momentum as the battery 22 exits the housing opening 34.

Figure 9:
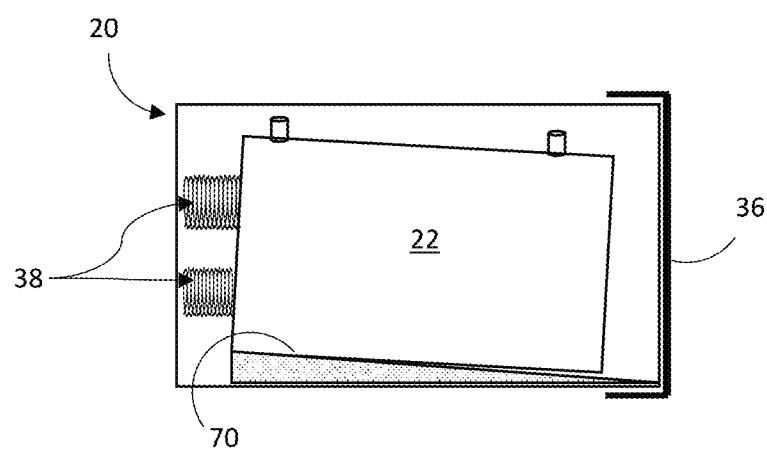
FIG. 9 schematically illustrates another example embodiment of a battery retention and ejection system while the battery is held in the housing.

FIG. 9 shows another example configuration in which the housing 30 includes a sloped ed surface 70 beneath the battery 22. The incline of the sloped surface 70 facilitates ejecting the battery 22 out of the housing 30.

The latch 36, the biasing member 38, or both may be made of shape memory material. With at least one of them made of shape memory material, the heat of a battery cell or pack that is rising will activate the battery ejection system 20 without requiring any additional sensors or activators. The heat-activated system 20, therefore, provides enhanced reliability in the event of a thermal runaway.

Only one battery 22 is illustrated for discussion purposes in FIGS. 2-4 and 6-9. The features shown in those drawings and described above are useful to automatically eject every battery of a battery pack that includes multiple batteries. Those skilled in the art who have the benefit of this description will be able to configure a version of the disclosed system to accommodate the particular arrangement and number of batteries associated with a vehicle of interest.

While some of the example configurations are shown in the drawings and described above have at least one feature that is distinct from other configurations, such features are not necessarily limited to that example configuration. Other versions of battery retention and ejection systems are possible by making different combinations of the features disclosed here. Additionally, other features may be added to meet the needs of a particular situation or vehicle.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A vehicle battery retention and ejection system, comprising:
 a housing having at least one portion that selectively closes an opening of the housing;
 a latch that secures the portion of the housing in a closed position when the latch is in a first condition, the latch allowing the portion of the housing to move into an open position when the latch is in a second, different condition; and
 a biasing member that is configured to apply a force onto a battery in the housing to urge the battery out of the housing,
 wherein at least one of the latch and the biasing member comprises a shape memory material that is in a first state when a temperature of the battery is below a threshold temperature, the shape memory material transitioning to a second state when the temperature of the battery exceeds the threshold temperature, the second state of the shape memory material causing the latch to transition from the first condition to the second condition so the portion of the housing moves into the open position and the biasing member forces the battery out of the housing through the opening.

2. The system of claim 1, wherein the latch comprises the shape memory material and the latch changes shape when the battery temperature exceeds the threshold temperature.

3. The system of claim 1, wherein the biasing member comprises the shape memory material and the biasing member changes shape when the battery temperature exceeds the threshold temperature.

4. The system of claim 1, wherein the biasing member comprises a spring.

5. The system of claim 1, wherein the shape memory material comprises Nitinol.

6. The system of claim 1, wherein the housing includes rollers that rotate as the biasing member forces the battery out of the housing.

7. The system of claim 1, wherein the housing includes a sloped surface beneath the battery and the battery slides along the sloped surface as the biasing member forces the battery out of the housing.

8. The system of claim 1, wherein the housing includes at least one rail in contact with the battery and the battery slides along the rail as the biasing member forces the battery out of the housing.

9. The system of claim 1, wherein the shape memory material has an alloy composition and the threshold temperature is based on at least one characteristic of the alloy composition.

10. The system of claim 1, wherein
the biasing member comprises a spring,
the spring comprises the shape memory material,
the latch comprises the shape memory material, and
the shape memory material comprises Nitinol.

* * * * *